(12) United States Patent
Wobben

(10) Patent No.: US 8,261,681 B2
(45) Date of Patent: Sep. 11, 2012

(54) SHIP

(76) Inventor: Aloys Wobben, Aurich (DE)

( * ) Notice: Subject to any disclaimer, the term of this patent is extended or adjusted under 35 U.S.C. 154(b) by 692 days.

(21) Appl. No.: 11/917,336

(22) PCT Filed: Jun. 16, 2006

(86) PCT No.: PCT/EP2006/005786
§ 371 (c)(1),
(2), (4) Date: Aug. 10, 2009

(87) PCT Pub. No.: WO2006/133950
PCT Pub. Date: Dec. 21, 2006

(65) Prior Publication Data
US 2009/0311924 A1    Dec. 17, 2009

(30) Foreign Application Priority Data

Jun. 17, 2005   (DE) .......................... 10 2005 028 447

(51) Int. Cl.
*B63B 35/00* (2006.01)
(52) U.S. Cl. ................. 114/39.3; 440/6; 440/8
(58) Field of Classification Search ................. 114/39.3, 114/362, 72, 73, 76, 78; 416/4, 1; 440/6, 440/8, 49, 50, 3; 414/141.9
See application file for complete search history.

(56) References Cited

U.S. PATENT DOCUMENTS

| | | | |
|---|---|---|---|
| 1,674,169 A | 6/1928 | Flettner | |
| 2,141,181 A * | 12/1938 | Geddes | 114/362 |
| 2,713,392 A * | 7/1955 | Von Karman Theodore et al. | 416/4 |
| 3,616,776 A * | 11/1971 | Anker-Nilsen | 114/76 |
| 4,398,895 A | 8/1983 | Asker | |
| 4,492,310 A * | 1/1985 | Weingart | 114/260 |
| 4,602,584 A | 7/1986 | North et al. | |
| 4,760,702 A | 8/1988 | Ammann et al. | |
| 4,795,312 A | 1/1989 | Purcaru | |
| 4,870,558 A * | 9/1989 | Luce | 363/87 |
| 5,616,056 A * | 4/1997 | Meissner | 440/3 |
| 6,302,652 B1 | 10/2001 | Roberts | |
| 6,644,926 B1 * | 11/2003 | Vandyke | 440/49 |
| 6,848,382 B1 | 2/2005 | Bekker | |

FOREIGN PATENT DOCUMENTS

| | | |
|---|---|---|
| BE | 895044 | 3/1983 |
| CN | 87 1 00987 A | 10/1987 |
| CN | 87209395 U | 2/1988 |
| DD | 243251 | 2/1987 |
| DE | 422057 | 11/1925 |

(Continued)

OTHER PUBLICATIONS

"Die Segelmaschine" by Claus Dieter Wagner, Ernst Kabel Verlag GmbH, Hamburg, 1991, pp. 154-175.

(Continued)

*Primary Examiner* — Lars A Olson
(74) *Attorney, Agent, or Firm* — Seed IP Law Group PLLC

(57) ABSTRACT

There is provided a ship, in particular a cargo ship. It has a plurality of Magnus rotors, wherein associated with each of the plurality of Magnus rotors is an individually actuable electric motor (M) for rotating the Magnus rotor, wherein associated with each electric motor (M) is a converter (U) for controlling the rotary speed and/or the rotary direction of the electric motor (M).

7 Claims, 9 Drawing Sheets

FOREIGN PATENT DOCUMENTS

| | | |
|---|---|---|
| DE | 2430630 | 4/1976 |
| DE | 4101238 | 7/1992 |
| DE | 19952460 | 5/2001 |
| DE | 10102740 | 8/2002 |
| GB | 2 072 112 | 9/1981 |
| GB | 2111007 A | 6/1983 |
| JP | 50155789 | 12/1975 |
| JP | 57018596 A | 1/1982 |
| JP | 57033082 A | 2/1982 |
| JP | 57055292 A | 4/1982 |
| JP | 58087698 U | 6/1983 |
| JP | 59206296 A | 11/1984 |
| JP | 60038290 A | 2/1985 |
| JP | 60095398 U | 6/1985 |
| JP | 60139593 A | 7/1985 |
| JP | 61113090 U | 7/1986 |
| JP | 61169796 U | 10/1986 |
| JP | 62129387 U | 8/1987 |
| JP | 62231889 A | 10/1987 |
| JP | 63098899 U | 6/1988 |
| JP | 4331694 A | 11/1992 |
| JP | 05213271 A | 8/1993 |
| JP | 08-026186 | 1/1996 |
| JP | 2000262082 A | 9/2000 |
| JP | 2001030979 A | 2/2001 |
| JP | 2003138836 A | 5/2003 |
| KR | 63-195998 | 12/1988 |
| KR | 10-1993-0004152 | 3/1993 |

OTHER PUBLICATIONS

"Hybrid rotors for wind propulsion", Marine Engineers Review, Sep. 1, 1991, London, GB, pp. 54-55.

Beverley, J.A., "Electric Propulsion Drives," Marine Engineering, Oct. 1, 1991, pp. 304-305.

* cited by examiner

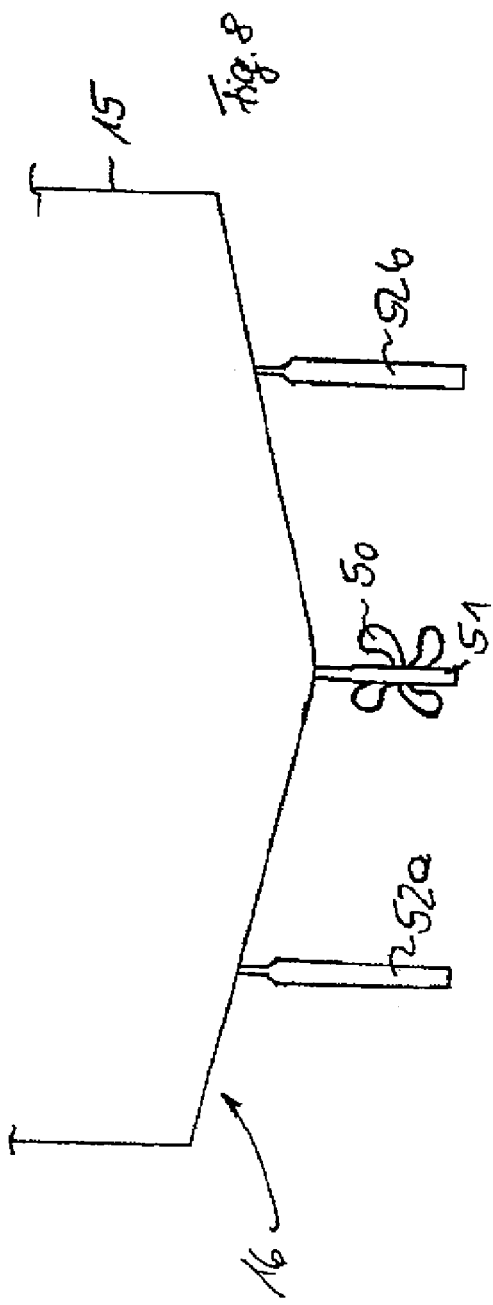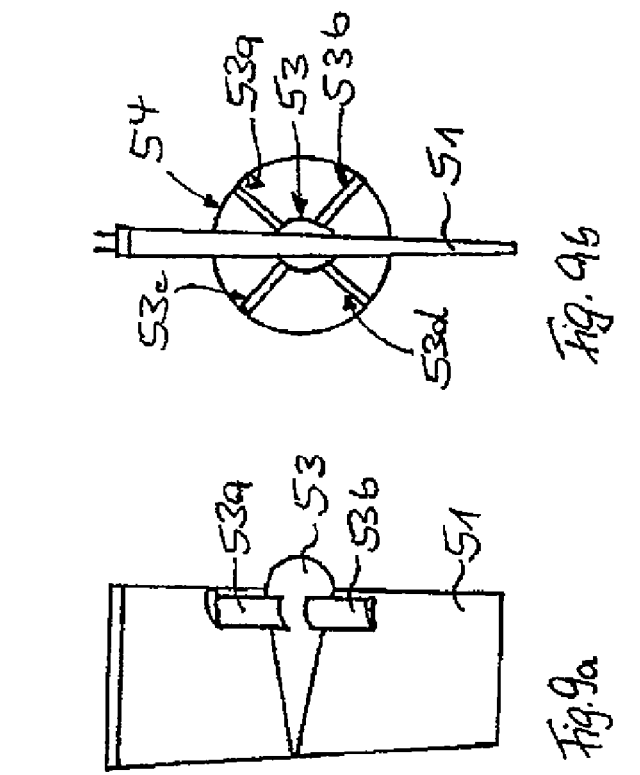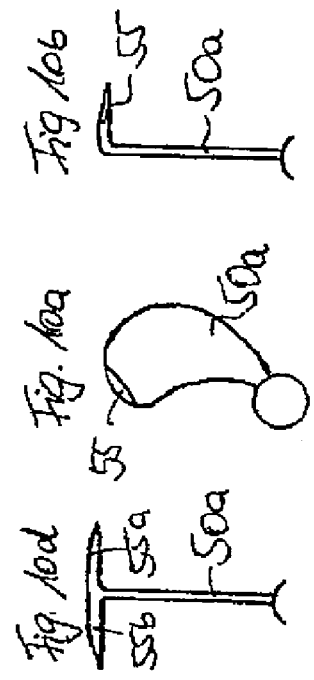

SHIP

BACKGROUND

1. Technical Field

The invention concerns a ship, in particular a cargo ship, comprising a Magnus rotor.

2. Description of the Related Art

A ship of that kind is already known from 'Die Segelmaschine' by Claus Dieter Wagner, Ernst Kabel Verlag GmbH, Hamburg, 1991, page 156. That involved investigating whether a Magnus rotor can be used as a drive or an ancillary drive for a cargo ship.

U.S. Pat. No. 4,602,584 also discloses a ship using a plurality of Magnus rotors for driving the ship. DD 243 251 A1 also discloses a ship having a Magnus rotor or a Flettner rotor. DE 42 20 57 also discloses a ship having a Magnus rotor. Attention is further directed to the following state of the art: U.S. Pat. No. 4,398,895, DE 101 02 740 A1, U.S. Pat. No. 6,848,382 B1, DE 24 30 630, and DE 41 01 238 A.

The Magnus effect describes the occurrence of a transverse force, that is to say perpendicularly to the axis and to the afflux flow direction, in respect of a cylinder which rotates about its axis and which has an afflux flow in perpendicular relationship to the axis. The flow around the rotating cylinder can be thought of as a superimposition of a homogeneous flow and a whirl flow around the body. The uneven distribution of the overall flow affords an asymmetrical pressure distribution at the periphery of the cylinder. A ship is thus provided with rotating or turning rotors which in the wind flow generate a force which is perpendicular to the effective wind direction, that is to say the wind direction which is corrected with the highest speed, and that force can be used similarly to the situation involving sailing, to drive the ship forward. The perpendicularly disposed cylinders rotate about their axis and air which is flowing thereto from the side then preferably flows in the direction of rotation around the cylinder, by virtue of surface friction. On the front side therefore the flow speed is greater and the static pressure is lower so that the ship is subjected to a force in the forward direction.

BRIEF SUMMARY

One object of the present invention is to provide a ship which involves a low level of fuel consumption.

Thus there is provided a ship, in particular a cargo ship, having a plurality of Magnus rotors. Associated with each of the Magnus rotors is an individually actuable electric motor for rotating the Magnus rotor. Associated in turn with each electric motor is a converter for controlling the rotary speed and/or the rotary direction of the electric motor.

Therefore there is provided a ship which can use the Magnus effect to drive it. The forward drive resulting from the Magnus rotors can be optimized by individual actuation of the various Magnus rotors.

BRIEF DESCRIPTION OF THE SEVERAL VIEWS OF THE DRAWINGS

The embodiments by way of example and advantages of the present invention are described in greater detail hereinafter with reference to the accompanying drawings in which:

FIG. 8 shows an arrangement of a plurality of rudders at the stern of the ship, FIG. 9a shows a diagrammatic view of the central rudder as a side view, FIG. 9b shows a diagrammatic view of the central rudder as a view from the rear, FIG. 10a shows a diagrammatic view of a propeller blade as a view from the rear, FIG. 10b shows a diagrammatic view of the propeller blade as a side view, FIG. 10c shows a diagrammatic view of the propeller blade as a plan view, FIG. 10d shows a diagrammatic side view of an alternative embodiment of a propeller blade, and FIG. 10e shows a diagrammatic plan view of the alternative propeller blade.

DETAILED DESCRIPTION

Figure 1:
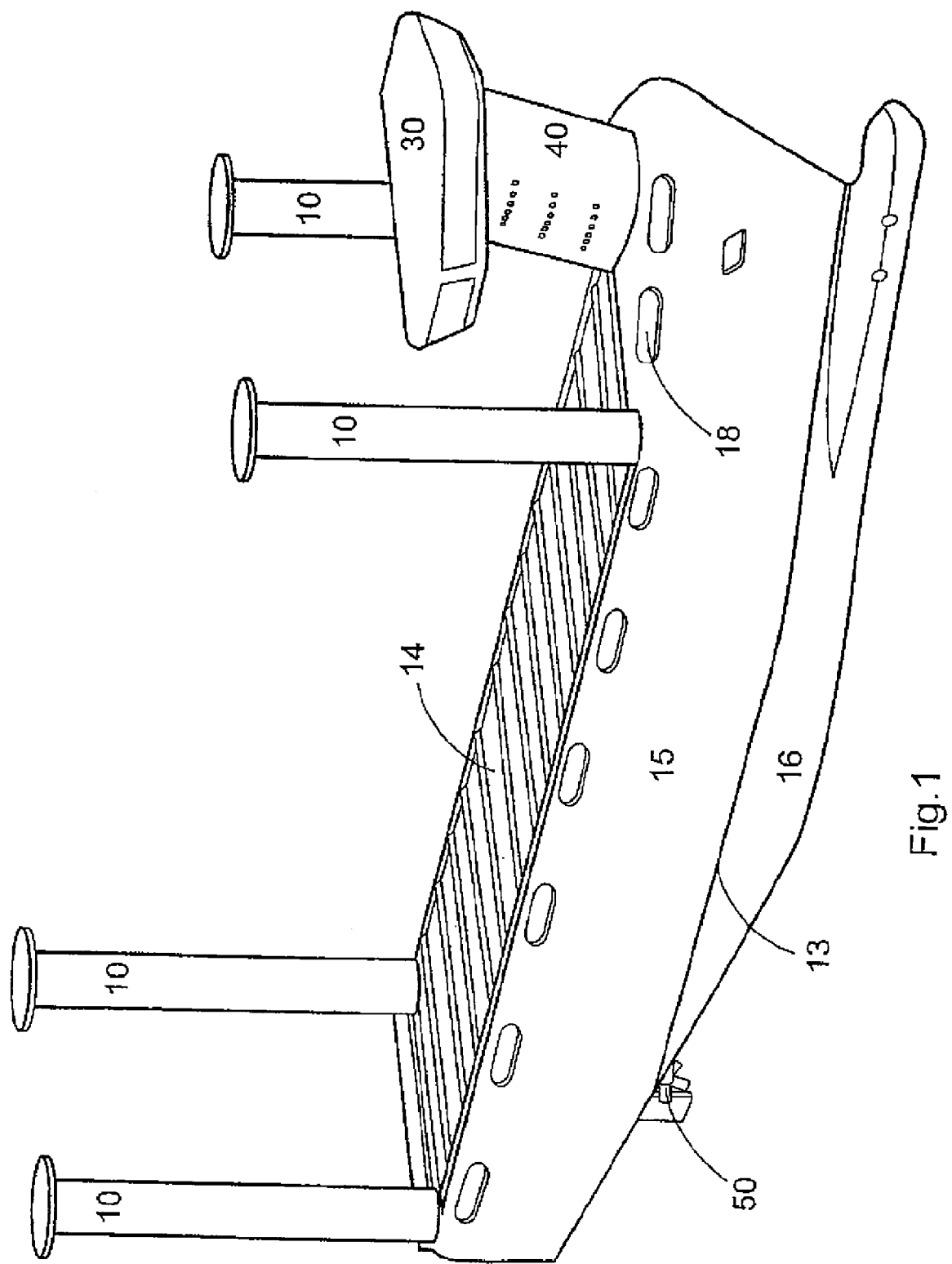
FIG. 1 shows a perspective view of a ship in accordance with a first embodiment.

FIG. 1 shows a diagrammatic view of a ship in accordance with a first embodiment. In this case the ship has a hull comprising an underwater region 16 and an above-water region 15. The ship further has four Magnus rotors or Flettner rotors 10 arranged at the four corners of the hull. The ship has a deckhouse 40 which is arranged in the forecastle, with a bridge 30. The ship has a screw 50 under water. For improved maneuverability the ship can also have transverse thruster rudders, wherein preferably one is provided at the stern and one to two are provided at the bow. Preferably those transverse thruster rudders are driven electrically. The accommodations, galley, supplies rooms, messes and so forth are arranged in the deckhouse 40. In this case the deckhouse 40, the bridge 30 and all superstructures above the weather deck 14 are of an aerodynamic configuration to reduce wind resistance. That is achieved in particular by substantially avoiding sharp edges and sharp-edged structures. As few superstructures as possible are provided in order to minimize wind resistance.

The ship in accordance with the first embodiment represents in particular a cargo ship designed specifically for transporting wind power installations and components thereof. The transportation of wind power installations and the corresponding components thereof can be only limitedly implemented with commercially available container ships as the components of a wind power installation represent a corresponding need for space which does not correspond to the commercially usual container dimensions while the masses of individual components are slight, in comparison with the amount of space they require. Mention may be made here by way of example of rotor blades or pod casings of wind power installations which are predominantly in the form of bulky glass fiber-reinforced structures of a weight of a few tones.

In this case the four Magnus rotors 10 represent wind-operated drives for the ship according to the invention. It is provided that the ship is basically to be driven with the Magnus rotors and the propeller or the main drive is to be used only for supplemental purposes when wind conditions are inadequate.

The configuration of the hull of the ship is designed in such a way that the stern projects out of the water as much as possible. That means on the one hand the height of the stern above the water level but also the length of the stern portion which also hangs over the surface of the water. That design configuration serves to provide for early breakaway of the water from the hull in order to avoid a wave which runs after the ship, as that results in a high resistance in respect of the hull because that wave which is produced by the ship is also created by the machine power output which however is then no longer available for driving the ship forward.

The bow of the ship is cut sharply over a relatively long distance. The underwater ship region is designed in such a way as to be optimized in respect of resistance in regard to hydrodynamic aspects, up to a height of about 3 meters above the construction waterline 13.

Thus the hull of the ship is designed not for maximum load-carrying capability but a minimum resistance (aerodynamic and hydrodynamic).

The superstructures of the ship are designed to afford good flow dynamics. That is achieved in particular by all surfaces being in the form of smooth surfaces. The design configuration of the bridge 30 and the deckhouse 40 is intended in particular to avoid turbulence therebehind so that actuation of the Magnus rotors can be effected with as little disturbance as possible. The bridge 30 with the deckhouse 40 is preferably arranged at the bow of the ship. It is also possible for the superstructures to be arranged in the middle of the ship, but that would unnecessarily impede loading or unloading of the cargo because the superstructures would thus be arranged precisely over the center of the cargo hold.

As an alternative thereto the deckhouse 40 and the bridge 30 can be arranged at the stern of the ship, but that would be found to be disadvantageous insofar as the Magnus rotors would interfere with a clear view forwardly.

The drive or forward drive for the ship is optimized for wind drive so that the ship of the present invention is a sailing ship.

The Magnus rotors are preferably arranged in the region of the corner points of the cargo holds so that they define a rectangular area. It should however be pointed out that another arrangement is equally possible. The arrangement of the Magnus rotors is based on a notion that a given rotor area is required to achieve the desired drive power by the Magnus rotors. The dimensions of the individual Magnus rotors are reduced by dividing that required surface area to a total of four Magnus rotors. That arrangement of the Magnus rotors provides that the largest possible continuous area remains free, which serves in particular for loading and unloading the ship and permits a deck load to be carried in the form of a plurality of container loads.

In this respect the Magnus rotors are designed in such a way that the operation thereof produces the same power (about 6000 kW) as is generated by the propeller. With an adequate wind therefore the drive for the ship can be implemented entirely by the Magnus rotors 10. That is achieved for example at a wind speed of between 12 and 14 meters per second so that the propeller or the main drive can be shut down as it is no longer required for propelling the ship.

The Magnus rotors and the main drive are thus designed in such a way that, if there is insufficient wind, the main drive only has to furnish the difference in power which cannot be produced by the Magnus rotors. Control of the drive is thus effected in such a way that the Magnus rotors 10 generate the maximum power or approximately the maximum power. An increase in the power of the Magnus rotors thus directly leads to a saving in fuel as no additional energy has to be generated by the main drive for the electric drive. The fuel saving is thus afforded without adaptation being required between a main drive or propeller driven by an internal combustion engine, and the control of the Magnus rotors.

Figure 2:
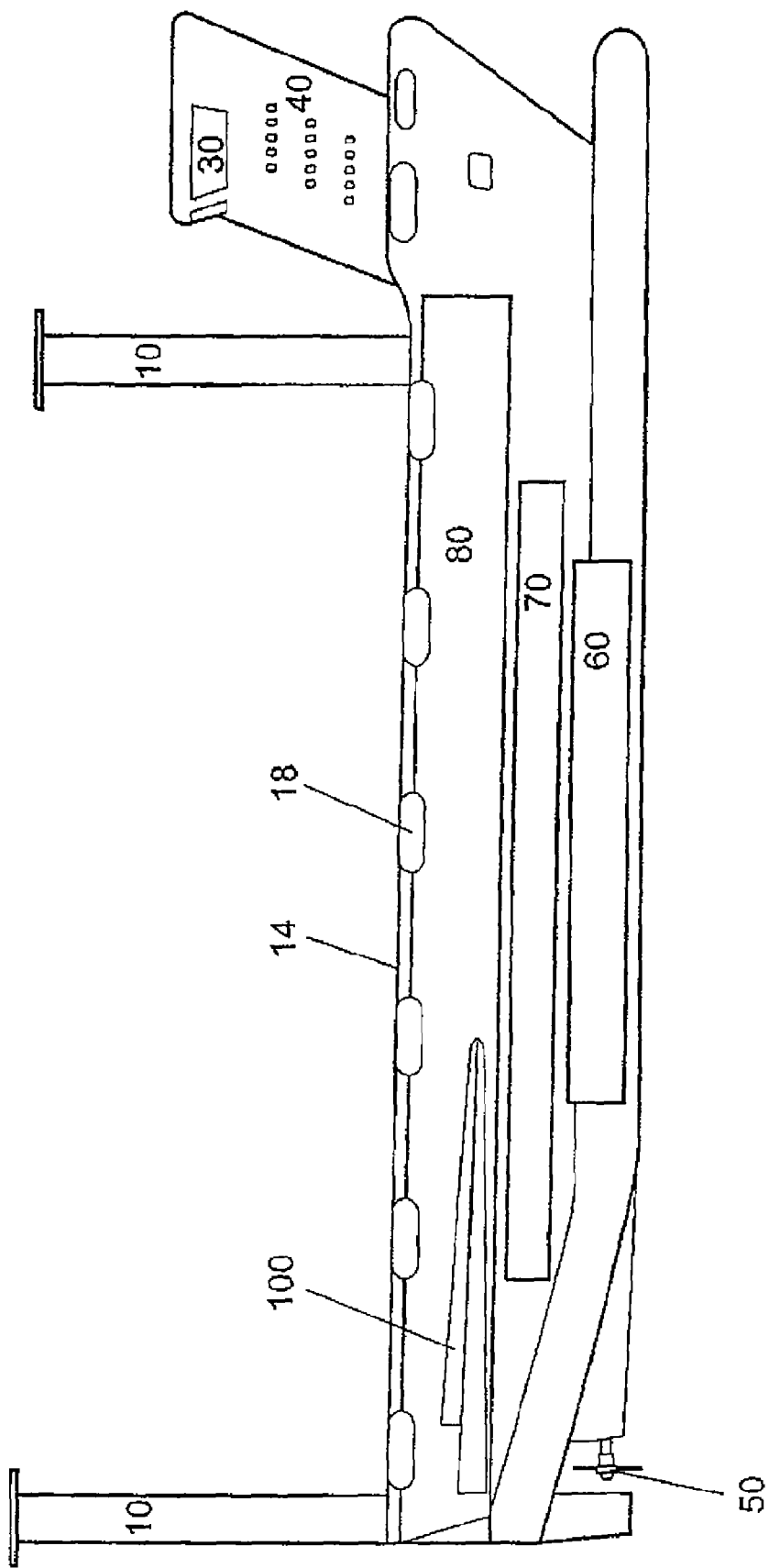
FIG. 2 shows a side view and a partial section of the ship of FIG. 1.

FIG. 2 shows a side view and a partial section of the ship of FIG. 1. The Magnus rotors 10, the deckhouse 40 and the bridge 30 are also shown here. The weather deck 14 has light admission openings 18 which can be covered over with transparent material to provide protection from weathering influences or sea water. In that respect the shape of the covers corresponds to that of the other hull portions. In addition the three load decks, that is to say a lower hold 60, a first intermediate deck 70 and a second intermediate deck 80 are shown here.

Figure 3:
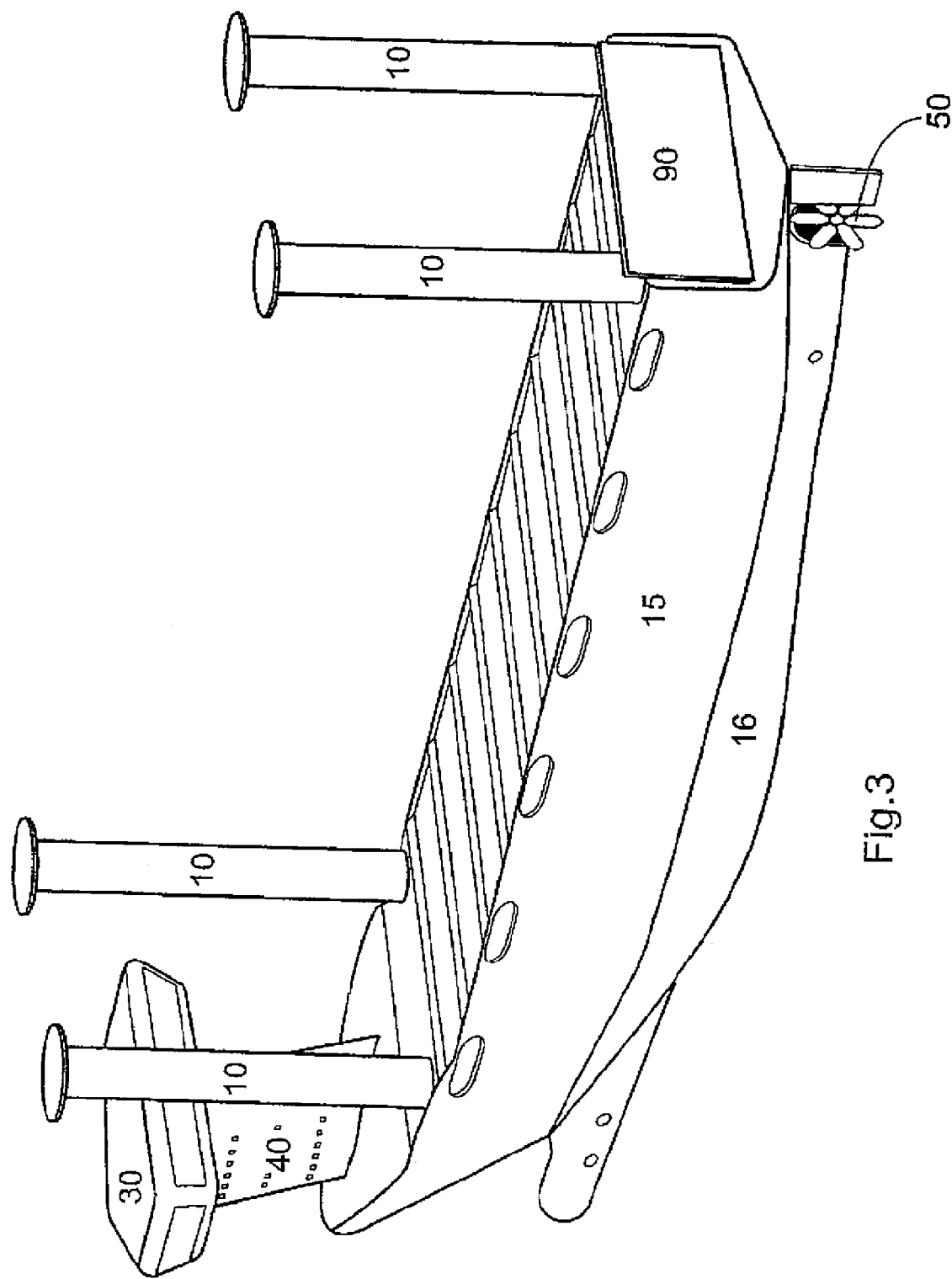
FIG. 3 shows a further perspective view of the ship of FIG. 1.

FIG. 3 shows a further diagrammatic view of the ship of FIG. 1. In particular the stern of the ship is shown here. The ship again has an upper region 15 and a lower region 16, a deckhouse 40 and a bridge 30 as well as four Magnus rotors 10. The ship further has a preferably hydraulically driven stern gate 90 by way of which rolling material can be loaded into and unloaded from the second intermediate deck 70b. The stern gate 90 in this case can be for example 7 meters in height and 15 meters in width. In addition a lift can be installed so that rolling loading of the first intermediate deck 80 and the lower hold 60 is possible. In that case the lower hold 60 is disposed below the construction waterline.

Figure 4:
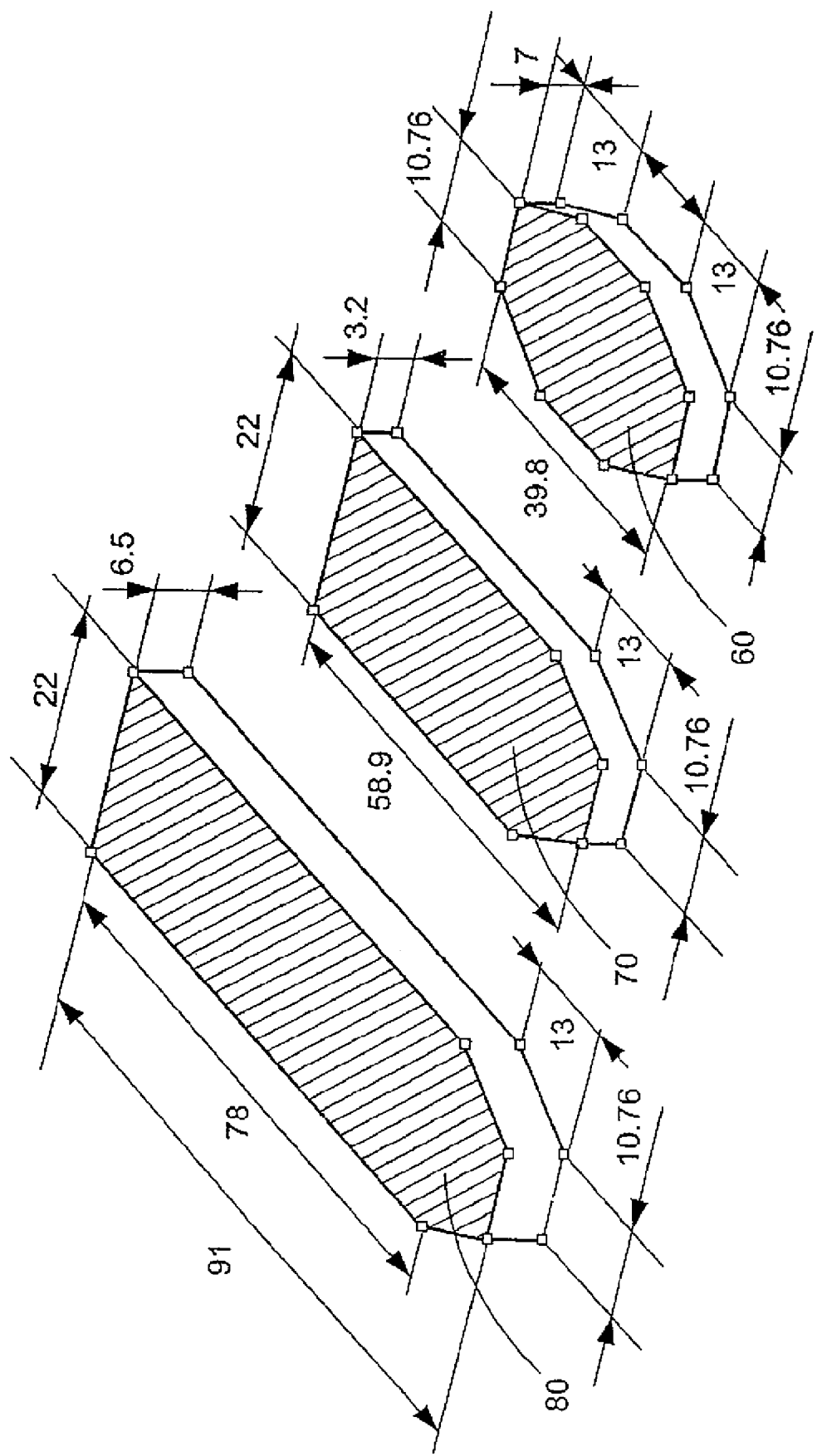
FIG. 4 shows a diagrammatic view of the various load decks of the ship of FIG. 1.

FIG. 4 shows a diagrammatic view of the various cargo holds, namely the lower hold 60, the first intermediate deck 70 and the second intermediate deck 80.

Figure 5A:
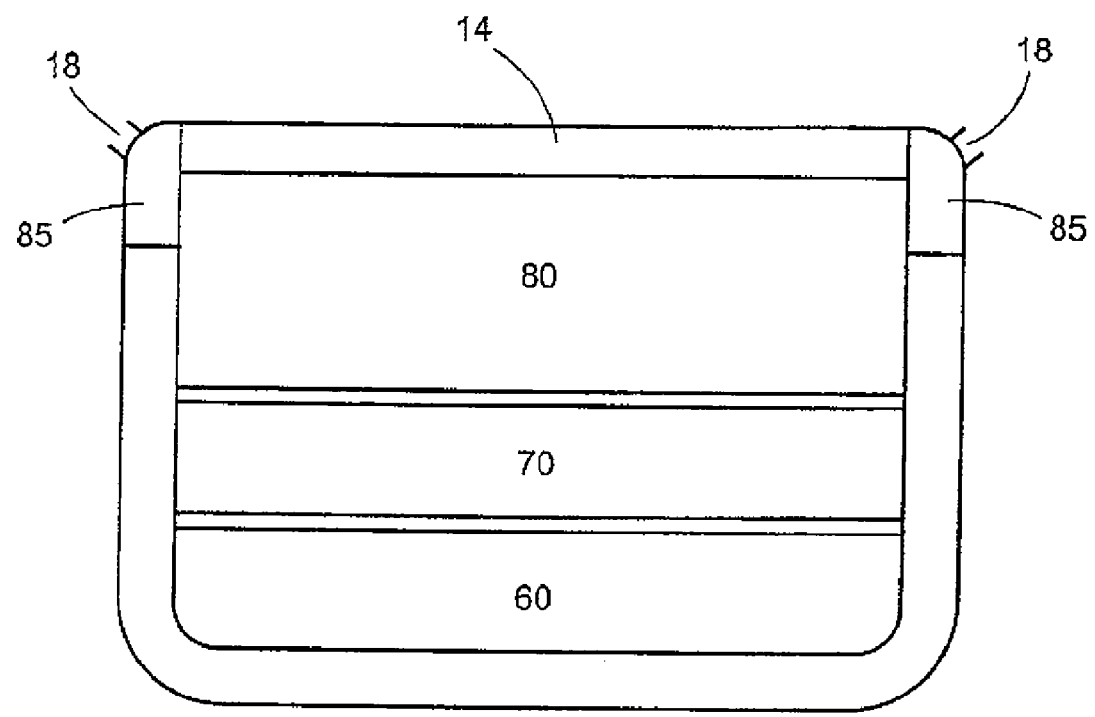
FIG. 5a shows a view in section of the ship of FIG. 1.

FIG. 5a shows a sectional view of the cargo holds. In this case the lower hold 60 is arranged as the lowermost cargo hold. The first intermediate deck 70 and the second intermediate deck 80 are arranged above the lower hold 60. The second intermediate deck 80 is closed off by the upper deck 14. Provided at the sides of the upper deck is an operational gangway or corridor or main deck 85 which preferably has openings 18. Those openings can optionally be adapted to be closable.

The hatch coaming of the loading hatches and the operational gangway 85 are provided over the entire length with a cover (the weather deck) so that this forms an area with a surface which is adapted to the external skin of the ship.

As can be seen in particular from FIG. 5a the ship has three mutually superposed cargo holds which have in particular smooth side walls without under-stowage. That is achieved by a double-skin structure for the hull. The lower hold 60 and the first intermediate deck 70 are preferably covered with individual pontoon covers which for example can be suspended from transverse members which are arranged at various heights in the side tank wall in such a way that they can be pivoted out of position. Those pontoons preferably have a load-carrying capacity of between six and ten tones per square meter. The pontoons can be moved for example by a deck crane. If the pontoons are not required they can be stowed in mutually superposed relationship in the front cargo hold region.

The above-described pontoons serve for subdividing the interior of the cargo holds, in which respect the pontoons can be suspended in different cargo holds at variable heights so that the height of the individual cargo holds can be adapted to be variable. Thus the cargo hold can be of differing heights in its extent or along its length so that a portion of the cargo hold of greater height can accommodate corresponding cargo while another portion of the cargo hold is of lower height so that correspondingly more height is available for the cargo hold to be found thereabove. That makes it possible to achieve extremely flexible division of the cargo area in the various cargo holds.

Provided between the outside wall of the ship and the wall of the cargo holds are ballast tanks which for example can be filled with ballast water to give the ship the required stability. Disposed above the ballast tank is the main deck 85, that is to say the main deck 85 extends outside the cargo hold beside the hatch coaming 86.

The top side of the hull of the ship is of a favorable flow dynamic configuration by virtue of the design configuration of the cover of the hatch coaming as there are no superstructures which could cause turbulence in the air flow. That is also the reason for covering the main deck as far as the outer skin of the ship, thus affording on the main deck 85 a gangway which is weather-protected and enclosed in a favorable flow dynamic fashion.

Figure 5C:
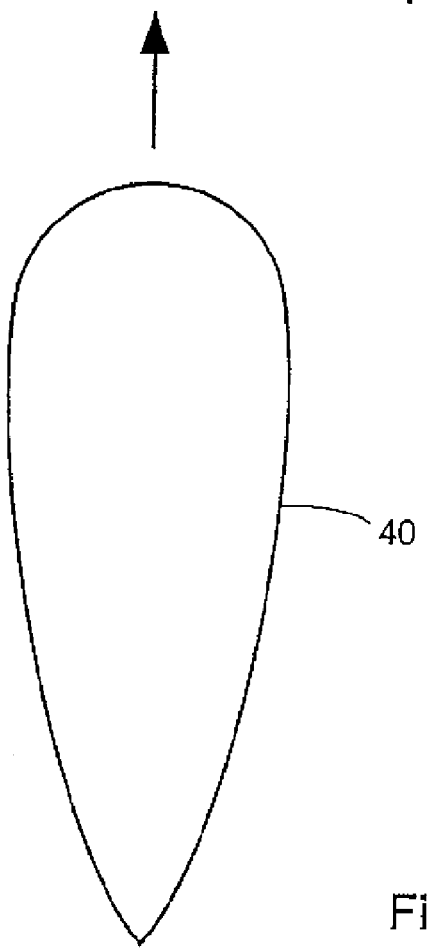
FIG. 5c shows a view in section of the deckhouse 40 of the ship of FIG. 1.
Figure 5B:
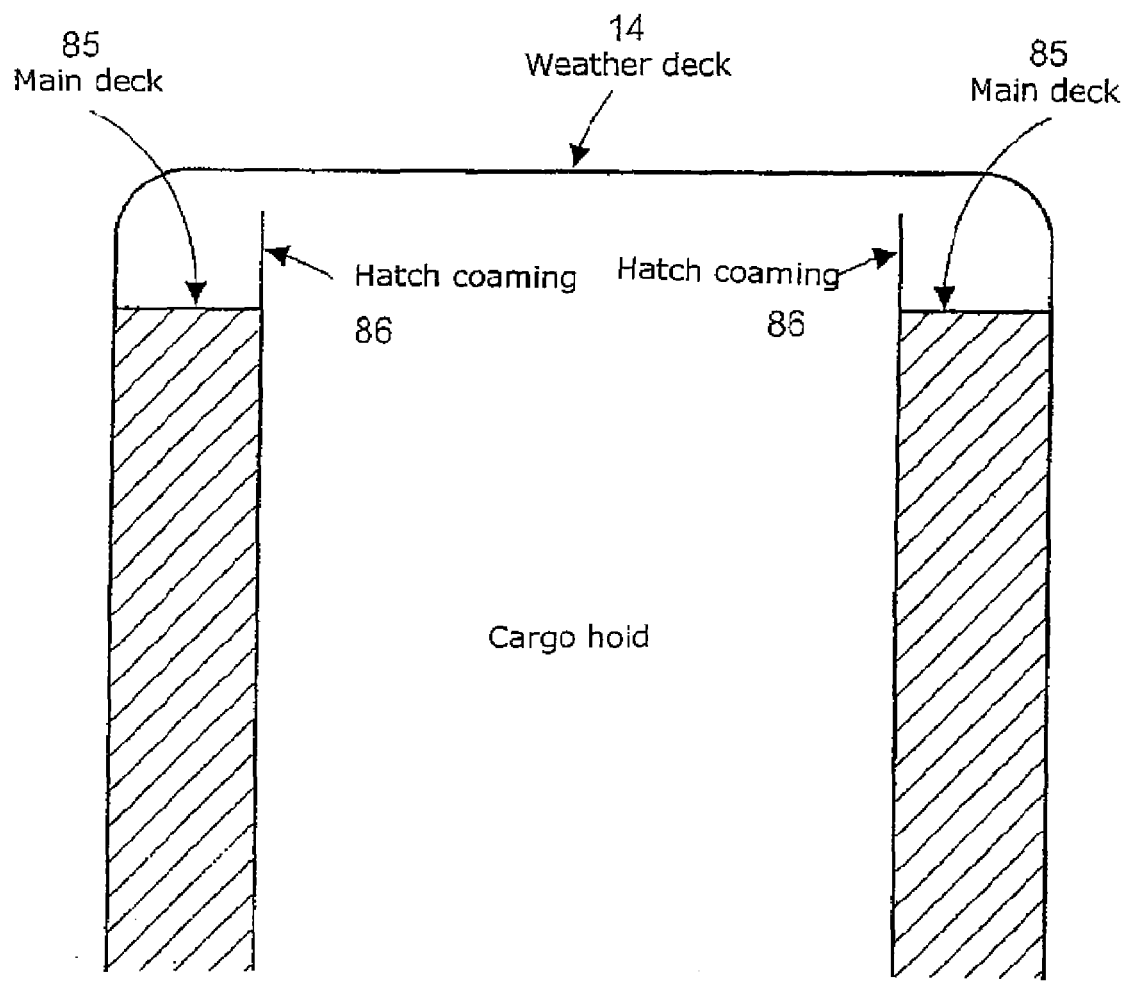
FIG. 5b shows a further view in section of the ship of FIG. 1.

FIG. 5b shows a further view in section of the ship of FIG. 1. A part of the section view of FIG. 5a is illustrated here. The weather deck 14 extends over the main deck 85 and joins the outer skin of the ship so as to provide an aerodynamically favorable shape. The main deck 85 has a hatch coaming 86 on the side towards the cargo hold. The configuration of the weather deck or the cover over the main deck which joins the outside skin of the ship also protects the main deck 85 from unfavorable weather conditions, apart from the aerodynamically favorable shape.

The ship also has a weather deck hatch. That weather deck hatch is for example 70×22 meters in size and is covered with a hydraulically driven folding cover system (such as for example a MacGregor system or the like). The load-carrying capacity of the weather deck hatches is preferably between 3 and 5 tones per square meter.

The weather deck hatch is closed from the rear forwardly so that the perpendicularly disposed hatch covers are between the Magnus rotors on the ship afterbody when the hatch is open. Preferably there is provided a plurality of lashing eyes for transporting components of a wind power installation. The materials for the tank covers of the lower hold 60 preferably do not represent combustible materials so that lashing eyes can be welded in place in the lower hold 60.

The load-carrying capacity of the tank cover is preferably between 17 and 20 tones per square meter. All cargo holds including the weather deck hatches are preferably also designed for transporting standard sea containers. Preferably there can be five layers of standard sea containers below deck and five layers on deck, thus providing a maximum capacity of 824 TEU.

FIG. 5c shows a view in section of the deckhouse 40 of the ship of FIG. 1. The cross-section shown in FIG. 5c only represents an example. In this case the deckhouse is of a rounded configuration at its one end while the deckhouse narrows rearwardly in an aerodynamically favorable fashion.

The ship also has an on-board crane (not shown) which is preferably provided in the form of a portal crane with a load-carrying capacity of for example 75 tones. The on-board crane is preferably provided on the main deck. The rails for the on-board crane preferably extend parallel to the coaming of the cargo hatches.

The height of the portal crane which extends above the main deck should preferably be such that the crane is designed for turning components of wind power installations and is only secondarily used for turning containers. As the crane is displaceable over the entire hatch length and over the entire width of the ship it is possible to reach any position within the cargo holds. The jib of the crane is preferably adjustable in height in order to be able to lift components of different sizes over the hatch coaming. Its length is therefore preferably 10 meters. The portal crane is in that case designed in such a way that it has a parking position in the front region of the second intermediate deck 70. Preferably the portal crane is arranged on a lift platform with rails so that it can close the weather deck thereover.

The ship in accordance with the first embodiment preferably has a diesel-electric main drive. Preferably seven diesel units each with a 1000 kW electrical power output centrally supply the entire on-board system with the main propulsion motors and the drive motors for the Magnus rotors as well as the transverse thruster rudders. In that case the diesel assemblies are switched on and off automatically according to the demands from the on-board system. The engine room for the diesel units is preferably disposed in the forecastle beneath the deck superstructures. The assembly compartment has an assembly hatch to the main deck and suitable devices which allow partial or complete replacement of units in a port. The fuel tanks are preferably disposed in the forecastle behind the double-wall outer skin of the ship. The main drive 50 is in that case driven by an electric motor which in turn receives its electric power from a diesel-driven generator. The main electric propulsion motors acts in that case directly on a variable-pitch propeller which has a maximum pitch angle of 90°. The blades can thus be moved into the feathered position. The main propulsion motors is disposed with all ancillary units in the main engine room behind the lowermost cargo hold. The electrical supply lines between the diesel unit room and the main engine room are implemented redundantly both on the port side and also on the starboard side. In addition thereto the ship can have an emergency diesel room in the ship afterbody region. The rudder of the ship is preferably afforded by a hydraulically operated balanced rudder in order to ensure good maneuverability.

The propeller drive is basically provided for the four Magnus rotors 10. The drive and the control of the four Magnus rotors is effected in that case completely automatically and in each case independently for each of the Magnus rotors so that the Magnus rotors can also be controlled differently, that is to say in respect of rotary direction and rotary speed.

Figure 6:
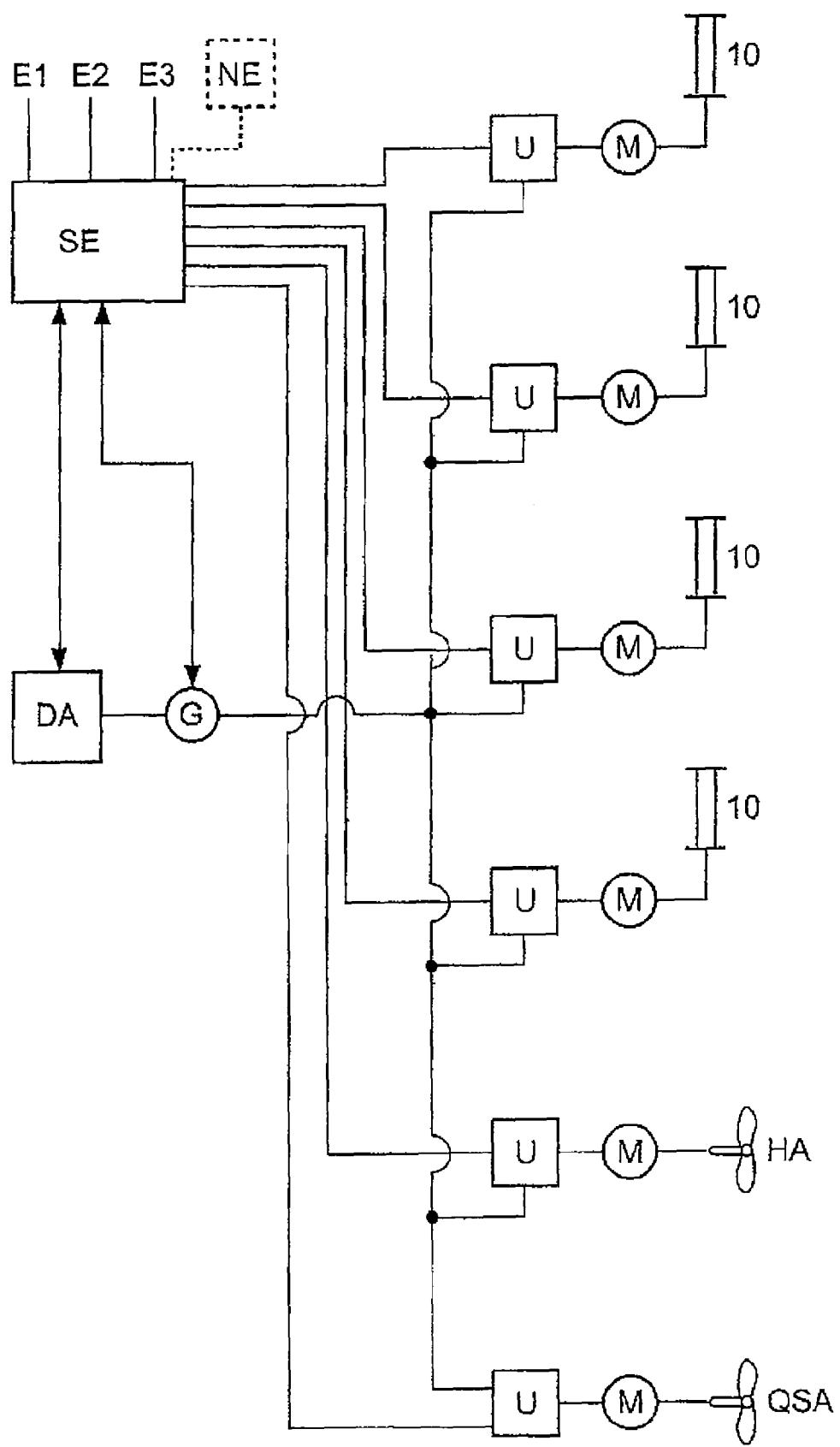
FIG. 6 shows a block circuit diagram of the control system of the ship in accordance with the first embodiment of FIG. 1.

FIG. 6 shows a block circuit diagram of the control system of the ship in accordance with the first embodiment of FIG. 1. Each of the four Magnus rotors 10 has its own motor M and a separate converter U. The converters U are connected to a central control unit SE. A diesel drive DA is connected to a generator G for generating electrical energy. The respective converters U are connected to the generator G. Also shown is a main drive HA labeled 50 in FIG. 3, which is also connected to an electric motor M which in turn is connected with a separate frequency converter U both to the control unit SE and also to the generator G. In this case the four Magnus rotors 10 can be controlled both individually and also independently of each other. Control of the Magnus rotors and the main drive is effected by the control unit SE which, on the basis of the currently prevailing wind measurements (wind speed, wind direction) E1, E2 and on the basis of the items of information relating to reference and desired travel speed E3 (and optionally on the basis of navigational information from a navigation unit NE), determines the corresponding rotary speed and rotary direction for the individual Magnus rotor 10 and the main drive in order to achieve a maximum propulsion force. The control unit SE in dependence on the thrust force of the four Magnus rotors and the current ship speed and the reference value of the speed steplessly regulates the main drive installation down, insofar as that is required. Thus the wind power strength can be converted directly and automatically into a fuel saving. The ship can also be controlled without the main drive by virtue of the independent control of the Magnus rotors 10. In particular stabilization of the ship can be achieved in a heavy sea by suitable control of the respective Magnus rotors 10.

Furthermore there can be provided one or more transverse thruster rudders QSA in order to improve the maneuverability of the ship. In this case a transverse thrust rudder can be provided on the ship at the stern and one to two transverse thrust rudders can be provided on the ship at the bow. A drive motor and a converter is associated with each transverse thruster rudder QSA. The converter U is again connected to the central control unit SE and the generator G. In that way the transverse thruster rudders (only one is shown in FIG. 6) can also be used for controlling the ship as they are connected to the central control unit (by way of the converter). The transverse thruster rudders QSA can each be actuated individually in respect of their rotary speed and rotary direction by the central control unit SE. Control can be effected in that case as described hereinbefore.

The control unit SE can control the power to each thrust providing devices, the four Magnus rotors, the main drive 50 and thruster rudders QSA, independently for each and also in light of the power provided to the others. The amount of power provided to each of the drive units is done in light of the power provided to each other and in light of desired fuel economy, desired travel speeds, wind speeds, direction and other factors. Thus, if there are winds in a selected direction, each of the four Magnus rotors may be independently driven, but each at a different speed or direction based on the wind and desired action, such as forward thrust, steering, stabilization control, etc.

The information on the driving power and direction of each Magnus rotor, the main drive 50, and QSA is available to the SE unit, so the power to each in light of this data can be coordinated. This will permit independent driving of each thrust providing device to achieve a balance of a desired direction of travel, speed, fuel consumption rate, etc.

A variable-pitch propeller is usually variable in a range which is between −20° and +20°. At a setting of +20° maximum propulsion is produced while a setting of the variable-pitch propeller at −20° causes the ship to move in reverse.

Preferably the adjustment range of the variable-pitch propeller is between −20° and +100°. Thus the propeller can be turned into a feathered position at about +90° whereby the resistance of the propeller is minimal when the ship is operating with pure Magnus propulsion. That is particularly advantageous insofar as the ship is of an aerodynamically more favorable configuration and it is possible for the propeller to be shut down at an earlier time as the Magnus drive can at an earlier time provide the power output required for forward propulsion of the ship as the resistance of the propeller blades no longer has to be overcome.

The advantageous values for the Magnus drive are achieved for example with afflux flows in a range of between 30° and about 130°, preferably between 45° and 130°, with respect to the ship's course. As the drive for the ship is to be effected as far as possible by the Magnus rotors, travel against the wind is only limitedly possible so that in terms of navigation a certain deviation from the ideal course is possible in order thereby to make it possible to make better use of the drive by the Magnus rotors. Thus both the wind direction and also the wind speed have an influence on navigation or control of the ship.

In this connection reference is to be made to the true wind direction and the true wind speed arising out of the meteorological data which are superposed by the movement of the ship. Vectorial addition of the meteorological wind direction and wind speed and the course and the speed of travel of the ship leads to what is referred to as the true wind which is described by the true wind direction and the true wind speed.

Maneuverability can be improved by the arrangement of four Magnus rotors 10 (two at the front and two at the stern on the ship).

The Magnus rotors 10 are preferably of an overall height of 27 meters above the main deck and are 3.5 meters in diameter. That affords a maximum headroom clearance of 40 meters with a draught of 5 meters. It will be appreciated that other dimensions are also possible. The electric motors and the converters of the respective Magnus rotors are disposed beneath the rotor in a separate compartment below deck. This means that the converters and the motors are accessible for maintenance purposes.

In addition to the above-described embodiments the ship can have a towing kite connected to the ship with a towing cable. In that way such a towing kite, with suitable wind directions, can also be used as an ancillary drive in order further to save fuel.

The above-described Magnus rotors can involve a high-speed mode of 15 and more, preferably more than 20. Such a high high-speed mode makes it possible to achieve a significant increase in efficiency.

Figure 7:
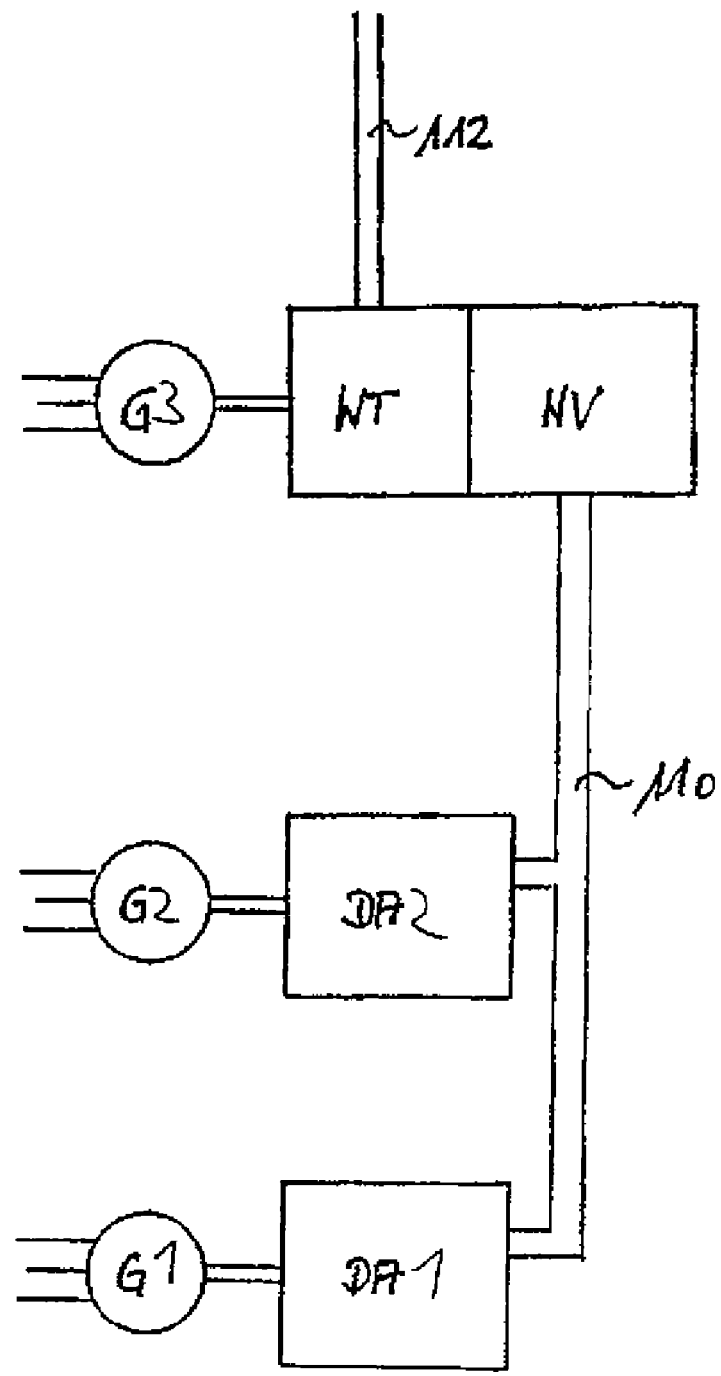
FIG. 7 shows a diagrammatic view of a generation system for electrical energy.

FIG. 7 shows a modified embodiment of the generation system for the electrical energy of the ship. The generation system shown in FIG. 7 can be integrated into the control system shown in FIG. 6. By way of example, the Figure shows two diesel drives or internal combustion engines DA with downstream-connected electrical generators G1, G2. The exhaust gases from the diesel drives DA are discharged through an exhaust pipe 110 and passed to a post-combustion unit NV. In that post-combustion unit NV the constituents of the exhaust gas which have not yet been burnt in the diesel drives DA are burnt and by way of a downstream-connected heat exchanger WT that combustion heat, but also a considerable part of the heat of the exhaust gas, is taken therefrom and used for driving a further generator G3 which from that heat generates additional electrical energy. That means that the diesel drives DA are correspondingly less heavily loaded and the fuel consumption thereof is correspondingly lower. The exhaust gases which are subjected to post-treatment in that fashion can then be discharged by way of a funnel 112.

The electrical energy generated by the generators G1-G3 can be fed as shown in FIG. 6 to the motor M of the main drive HA for example by way of an electrical on-board network. In addition the converters U and the electric motors M of the Magnus rotors 10 can be supplied with electrical energy by way of the on-board network. The on-board network can also be used to ensure the electrical energy supply for the ship.

FIG. 8 shows a simplified view of the cross-section of the hull of the ship. The hull has an upper region 15 and a lower region 16. A propeller 50 of the conventional propulsion drive system and the central rudder 51 are arranged midships.

Disposed at each of the two sides of the central rudder 51 is a respective further rudder 52a, 52b. Those further rudders 52a, 52b are arranged displaced by a predetermined distance from the central rudder 51 towards the port side (rudder 52a) and the starboard side (rudder 52b). Those two additional rudders 52a, 52b are of an area, the size of which is approximately twice as large as that of the central rudder 51. In that respect those additional rudders 52a, 52b serve primarily to improve the sailing properties of the ship, that is to say the properties when traveling using the Magnus rotor drive.

FIG. 9a shows a side view of an alternative embodiment of the central rudder 51. In this alternative embodiment the rudder 51 has a so-called Costa pear 53. Mounted on that Costa pear 53 are guide vanes 53a which are of such a configuration that they convert at least a part of the turbulence generated by the propeller 50 in the water into a forward propulsion force for the ship. In that way the power supplied in the propeller 50 is more effectively converted into a propulsion force and thus also contributes to the saving in fuel.

FIG. 9b shows a further view of the central rudder 51 with the Costa pear 53 and guide vanes 53a, 53b, 53c, 53d. Those guide vanes 53a-53d are additionally enclosed by a ring 54. That arrangement of the Costa pear, the guide vanes and the ring enclosing the latter further improves conversion of the power supplied to the propeller (not shown in this Figure, see FIG. 8, reference 50) into propulsion force for the ship. The rudder 51 can also be in the form of what is referred to as a 'twisted rudder'.

FIG. 10a shows in a greatly simplified view one of the propeller blades 50a with an edge arc 55 mounted thereon in a view from behind. FIG. 10b shows a side view of that propeller blade 50a and the edge arc 55 which bends off to one side (towards the right in the Figure) can be clearly seen there.

FIG. 10c shows a plan view of that propeller blade 50a and the edge arc 55a can be clearly seen as being of an elliptical shape. That elliptical shape leads to a particularly desirable behavior in terms of flow dynamics and a progressive detachment of the flow along the elliptical shape so that there is only still a very small part of the flow that has to come away from the edge arc 55a at the tip thereof. That means that flow detachment is linked to substantially lesser losses and that also contributes to an improved propulsion performance and thus better fuel utilization. An elliptical edge arc 55a' is shown in broken line in the left-hand part of this Figure. That indicates that the edge arc can naturally be bent out of the plane of the propeller blade 50a not only towards the side shown in FIG. 10b but also towards the opposite side, depending on the respective requirements involved.

FIGS. 10d and 10e show a similar even if alternative embodiment. It will be clearly seen from FIG. 10d that here there are two edge arcs 55a, 55b which are angled towards mutually opposite sides out of the plane of the propeller blade 50a. In contrast to the view in FIGS. 10b and 10c in which only one edge arc was illustrated, there are two edge arcs here. That provides that the losses due to detachment of the flow from the propeller blades 50a are still further reduced and thus even more force is available for propelling the ship.

The invention claimed is:

1. A cargo ship comprising:
a plurality of Magnus rotors positioned on an upper deck of the cargo ship and exposed to receive wind;
a plurality of individually actuable electric motors associated with and coupled to the respective Magnus rotors for rotating the Magnus rotors;
a plurality of electrical converters, each associated with each respective electric motor for providing electric power to drive the respective electric motors coupled to the Magnus rotors;
a subdividable cargo hold, wherein subdivision of the cargo hold is effected by fitting pontoon covers; and
a closable stern gate that is hydraulically driven.

2. The cargo ship according to claim 1, further comprising:
a lift which is arranged in a region of the stern gate and by way of which the cargo hold can be reached.

3. A cargo ship comprising:
a plurality of Magnus rotors positioned on an upper deck of the cargo ship and exposed to receive wind;
a plurality of individually actuable electric motors associated with and coupled to the respective Magnus rotors for rotating the Magnus rotors;
a plurality of electrical converters, each associated with each respective electric motor for providing electric power to drive the respective electric motors coupled to the Magnus rotors;
a subdividable cargo hold, wherein subdivision of the cargo hold is effected by fitting pontoon covers; and
a closable weather deck hatch having a hydraulically driven folding cover system which extends substantially over an entire length of the cargo hold.

4. A cargo ship comprising:
a plurality of Magnus rotors positioned on an upper deck of the cargo ship and exposed to receive wind;
a plurality of individually actuable electric motors associated with and coupled to the respective Magnus rotors for rotating the Magnus rotors;
a plurality of electrical converters, each associated with each respective electric motor for providing electric power to drive the respective electric motors coupled to the Magnus rotors;
a subdividable cargo hold, wherein subdivision of the cargo hold is effected by fitting pontoon covers; and
an on-board crane which is movable on rails, wherein the on-board crane is arranged on a lift platform in such a way that the on-board crane is movable into a plane below a weather deck in such a way that the weather deck can close over the on-board crane.

5. A cargo ship comprising:
a plurality of Magnus rotors positioned on an upper deck of the cargo ship and exposed to receive wind;
a plurality of individually actuable electric motors associated with and coupled to the respective Magnus rotors for rotating the Magnus rotors;
a plurality of electrical converters, each associated with each respective electric motor for providing electric power to drive the respective electric motors coupled to the Magnus rotors;
a subdividable cargo hold, wherein subdivision of the cargo hold is effected by fitting pontoon covers;
at least one internal combustion engine coupled to an electric generator for generating electrical energy;
a post-combustion unit for post-combustion of exhaust gases from the internal combustion engine;
a heat exchanger for taking off combustion heat of the post-combustion unit and/or heat of the exhaust gases of the internal combustion engine; and
a generator which is coupled to the heat exchanger and which is driven by heat delivered by the heat exchanger.

6. A cargo ship comprising:
a plurality of Magnus rotors positioned on an upper deck of the cargo ship and exposed to receive wind;
a plurality of individually actuable electric motors associated with and coupled to the respective Magnus rotors for rotating the Magnus rotors;
a plurality of electrical converters, each associated with each respective electric motor for providing electric power to drive the respective electric motors coupled to the Magnus rotors;
a propeller, and
a rudder which has a Costa pear, at least two guide vanes arranged on the Costa pear in such a way that a part of the turbulence generated by the propeller is converted into a propulsion force.

7. The cargo ship according to claim 6, further comprising:
a ring which encloses the guide vanes.

* * * * *

UNITED STATES PATENT AND TRADEMARK OFFICE Certificate

Patent No. 8,261,681 B1                                      Patented: September 11, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Rolf Rohden, Aurich (DE).

Signed and Sealed this Fourth Day of June 2013.

S. JOSEPH MORANO
*Supervisory Patent Examiner*
Art Unit 3617
Technology Center 3600